United States Patent
Tseng

(10) Patent No.: US 11,143,733 B2
(45) Date of Patent: Oct. 12, 2021

(54) OBJECT ORIENTATION SYSTEM, OBJECT ORIENTATION METHOD AND ELECTRONIC APPARATUS

(71) Applicant: I-Chun Tseng, Taipei (TW)

(72) Inventor: I-Chun Tseng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 158 days.

(21) Appl. No.: 16/528,665

(22) Filed: Aug. 1, 2019

(65) Prior Publication Data

US 2020/0217916 A1 Jul. 9, 2020

(30) Foreign Application Priority Data

Jan. 3, 2019 (TW) ................................ 108100224

(51) Int. Cl.
| | | |
|---|---|---|
| *G01S 3/12* | (2006.01) | |
| *G01S 3/04* | (2006.01) | |
| *G01S 3/26* | (2006.01) | |
| *G01S 5/12* | (2006.01) | |

(52) U.S. Cl.
CPC ............... *G01S 3/12* (2013.01); *G01S 3/043* (2013.01); *G01S 3/26* (2013.01); *G01S 5/12* (2013.01)

(58) Field of Classification Search
CPC ... G01S 3/12; G01S 3/043; G01S 3/26; G01S 3/065; G01S 5/12; G01S 1/02; H01Q 7/00; G01B 7/004
USPC ....................................................... 342/448
See application file for complete search history.

(56) References Cited

U.S. PATENT DOCUMENTS

| | | | |
|---|---|---|---|
| 9,432,963 B2 | 8/2016 | Wilmhoff et al. | |
| 2003/0229445 A1* | 12/2003 | Tingley | G01S 11/06 701/408 |
| 2006/0092040 A1 | 5/2006 | Fishkin et al. | |
| 2011/0210959 A1* | 9/2011 | Howard | G01S 13/76 345/418 |
| 2016/0259027 A1* | 9/2016 | Said | G01S 5/02 |
| 2017/0332208 A1* | 11/2017 | Cardoso de Moura | H04W 24/08 |
| 2018/0213417 A1* | 7/2018 | Lysejko | H01Q 1/50 |

FOREIGN PATENT DOCUMENTS

EP 2287779 4/2015

OTHER PUBLICATIONS

"Office Action of Taiwan Counterpart Application," dated Aug. 19, 2019, p. 1-p. 7.

* cited by examiner

*Primary Examiner* — Harry K Liu
(74) *Attorney, Agent, or Firm* — JCIPRNET

(57) ABSTRACT

An object orientation system, an object orientation method and an electronic apparatus are provided. A signal transmitter includes a directional antenna and emits a first wireless signal. A plurality of signal receivers are respectively disposed in a plurality of orientations. The signal receivers receive the first wireless signal and measure a plurality of first received signal strength indicators of the first wireless signal. The electronic apparatus is coupled to the signal receivers, estimates a plurality of strength variation data of the first received signal strength indicators measured by the signal receivers, and obtains orientation information of the signal transmitter according to the strength variation data corresponding to the signal receivers.

15 Claims, 9 Drawing Sheets

OBJECT ORIENTATION SYSTEM, OBJECT ORIENTATION METHOD AND ELECTRONIC APPARATUS

CROSS-REFERENCE TO RELATED APPLICATION

This application claims the priority benefit of Taiwan application serial no. 108100224, filed on Jan. 3, 2019. The entirety of the above-mentioned patent application is hereby incorporated by reference herein and made a part of this specification.

BACKGROUND OF THE INVENTION

1. Field of the Invention

The invention relates to an orientation technology, and more particularly, relates to an object orientation system, an object orientation method and an electronic apparatus.

2. Description of Related Art

With the advancement of network and communication technology, an indoor communication technology based on wireless communication has been widely used in various fields. For instance, home care systems and medical monitoring systems can monitor location and activity status of caretakers through the indoor monitoring technology to achieve immediate monitoring and save labor costs. In general, a monitored object can wear a wireless transceiver, so location information of the monitored object can be obtained by wirelessly positioning the wireless transceiver. However, in order to further monitor orientation information of the monitored object, it is often necessary to additionally configure an orientation sensor to achieve the purpose of detecting the orientation information. The orientation sensor for obtaining the orientation information includes, for example, a gyroscope sensor, an accelerometer, a compass sensor, etc. Apparently, as the orientation sensor requires a certain amount of power consumption, a usable time of the electronic apparatus worn by the monitored object will be reduced after each charging (or replacement of battery). In addition, the additional configuration of the orientation sensor will also increase overall cost of the indoor monitoring system.

SUMMARY OF THE INVENTION

In consideration of the above, the invention proposes an object orientation system, an object orientation method and an electronic apparatus, which are capable of estimating orientation information of a signal transmitter and an object according to a received signal strength indicator of a wireless signal without using the orientation sensor.

The invention provides an object orientation system, which includes a signal transmitter, a plurality of signal receivers and an electronic apparatus. The signal transmitter includes a directional antenna and emits a first wireless signal. The signal receivers are respectively disposed in a plurality of orientations. The signal receivers receive the first wireless signal and measure a plurality of first received signal strength indicators of the first wireless signal. The electronic apparatus is coupled to the signal receivers, estimates a plurality of strength variation data of the first received signal strength indicators measured by the signal receivers, and obtains orientation information of the signal transmitter according to the strength variation data corresponding to the signal receivers.

The invention provides an object orientation method, and the method includes the following steps. A first wireless signal is emitted by a signal transmitter, wherein the signal transmitter includes a directional antenna. The first wireless signal is received by a plurality of signal receivers, and a plurality of first received signal strength indicators of the first wireless signal are measured by the signal receivers. A plurality of strength variation data of the first received signal strength indicators measured by the signal receivers are estimated. Orientation information of the signal transmitter is obtained according to the strength variation data corresponding to the signal receivers.

The invention provides an electronic apparatus, which includes a data transmission device, a storage device and a processor. The data transmission device receives a plurality of first received signal strength indicators of a first wireless signal emitted by a signal transmitter. The storage device stores a plurality of commands.

The processor is coupled to the storage device and the data transmission device, and executes the commands for: estimating a plurality of strength variation data of the first received signal strength indicators measured by a plurality of signal receivers, and obtaining orientation information of the signal transmitter according to the strength variation data and orientations corresponding to the signal receivers.

Based on the above, in the embodiments of the invention, the signal transmitter disposed with the directional antenna emits the wireless signal. The signal receivers measure the received signal strength indicator of the wireless signal so the strength variation data of the received signal strength indicator measured by each signal receiver can be used to determine the orientation information of the signal transmitter. The strength variation data may be generated by calculating the received signal strength indicator measured by each signal receiver. As a result, with absence of the orientation sensor, the object orientation system, the object orientation method and the electronic apparatus of the invention can still estimate the object orientation of the signal transmitter.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
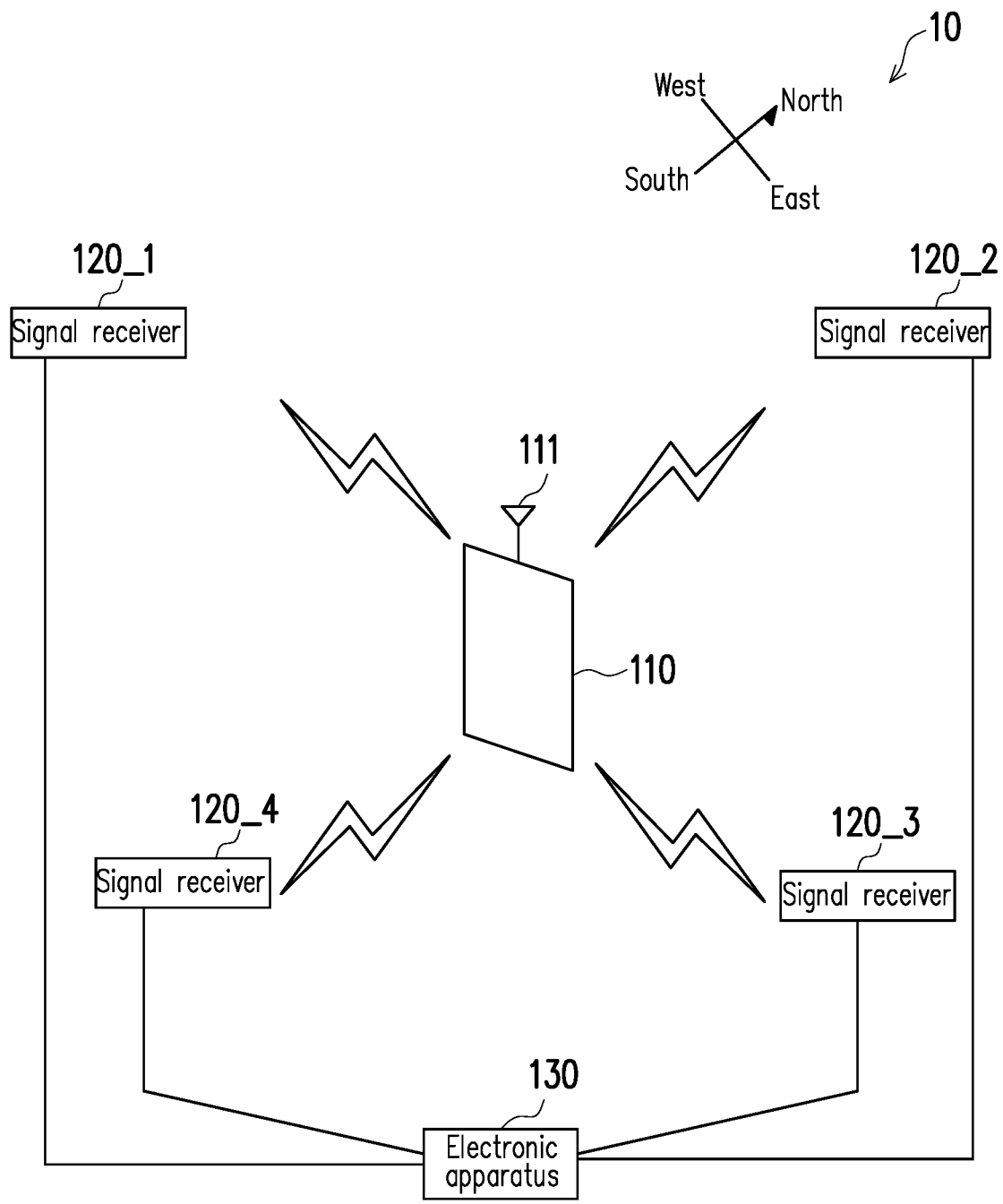
FIG. 1 is a schematic diagram illustrating an object orientation system in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. The embodiments are merely a part of the disclosure rather than disclosing all possible embodiments of the disclosure. More specifically, these embodiments are simply examples of the object orientation system, the object orientation method and the electronic apparatus recited in claims of the disclosure.

FIG. 1 is a schematic diagram illustrating an object orientation system according to an embodiment of the invention. Nonetheless, it should be understood that, the example of FIG. 1 is merely exemplary instead of limitations to the invention. With reference to FIG. 1, an object orientation system 10 includes a signal transmitter 110, a plurality of signal receivers 120_1 to 120_4 and an electronic apparatus 130. Although FIG. 1 illustrates four signal receivers 120_1 to 120_4 as an example, the number of the signal receivers is not particularly limited by the invention.

The signal transmitter 110 emits a first wireless signal through a wireless radio frequency technology. Specifically, the signal transmitter 110 includes a directional antenna 111 and emits the first wireless signal by using the directional antenna 111. In addition to the directional antenna 111, the signal transmitter 110 may also include a baseband circuit for generating a first wireless signal, a radio frequency circuit, and the like. For instance, the signal transmitter 110 may be a Bluetooth signal transmitter configured to emit a Bluetooth wireless signal in compliance with Bluetooth communication standards (e.g., Bluetooth 4.0), but the invention is not limited thereto. The signal transmitter 110 may also generate the first wireless signal according to other wireless communication standards, such as the communication standard of ZigBee or the WI-FI communication standard or the like. In other words, an operating band and a communication standard used for emitting the first wireless signal are not particularly limited by the invention.

In an embodiment, the signal transmitter 110 may be implemented as a wearable electronic device adapted to be worn on an object to be monitored, such as an electronic wristband or an attachable electronic card or the like. For instance, in a medical care application environment, a caretaker can wear the wearable electronic device described above so a monitor can track location and activity status of the caretaker in real time.

The signal receivers 120_1 to 120_4 can wirelessly communicate with the signal transmitter 110, and the same wireless communication standard of the signal transmitter 110 is correspondingly applied to the signal receivers 120_1~120_4. For instance, when the signal transmitter 110 is the Bluetooth signal transmitter, the signal receivers 120_1 to 120_4 will be Bluetooth signal receivers. The signal receivers 120_1 to 120_4 may respectively be disposed in a plurality of orientations. In the example of FIG. 1, the signal receiver 120_1 is disposed in the West; the signal receiver 120_2 is disposed in the North; the signal receiver 120_3 is disposed in the East; and the signal receiver 120_4 is disposed in the South, but the present invention is not limited thereto. The signal receivers 120_1 to 120_4 respectively receive the first wireless signal and measure a plurality of first received signal strength indicators of the first wireless signal.

In an embodiment, the signal receivers 120_1 to 120_4 may be implemented as a wireless access point (AP), a home base station or a micro receiver, etc., which are suitable for being disposed in an indoor environment. For instance, in the medical care application environment, the signal receivers 120_1 to 120_4 can be installed in a hospital sickroom or a general home room.

It should be noted that, when the signal transmitter 110 transmits the first wireless signal through the directional antenna 111, the directional antenna 111 can transmit and receive electromagnetic wave energy for a specific direction based on its radiation pattern. The directional antenna 111 is, for example, a planar directional antenna, but the invention is not limited thereto. In other words, based on the radiation pattern and a placement manner of the directional antenna 111, the received signal strength indicators measured by the signal receivers 120_1 to 120_4 will produce different performances respectively.

Figure 2:
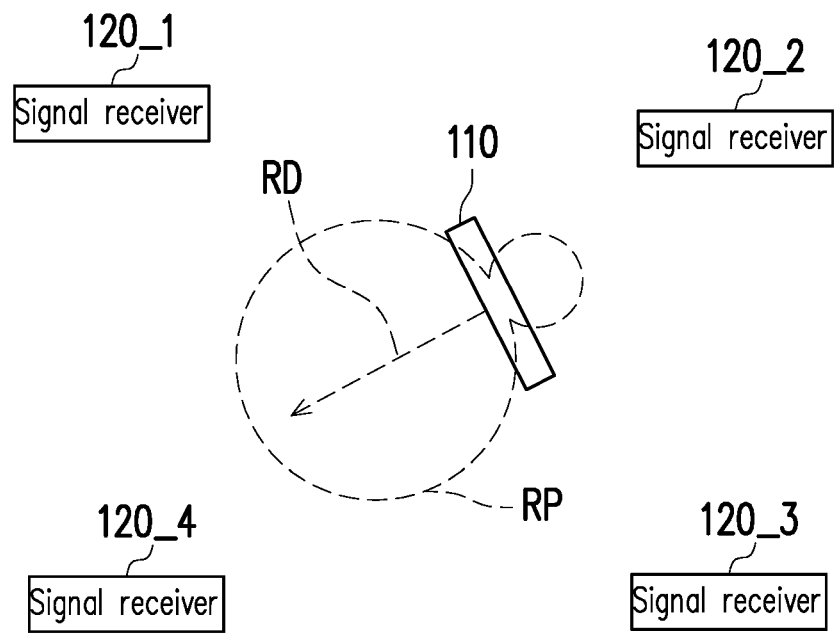
FIG. 2 is a schematic diagram illustrating an example of a radiation pattern of a directional antenna in an embodiment of the invention.

For example, FIG. 2 is a schematic diagram illustrating an example of a radiation pattern of a directional antenna in an embodiment of the invention. It is assumed that a radiation pattern RP of the directional antenna 111 is as shown in FIG. 2. The directional antenna 111 is configured to transmit and receive the electromagnetic wave energy in front of the wireless receiver 110. Therefore, a signal quality measured by the signal receiver 120_4 located in front of the wireless receiver 110 will be significantly better than a signal quality measured by the signal receiver 120_2. That is to say, the signal quality measured by the signal receiver 120_2 located behind the wireless receiver 110 will be worse than the signal quality measured by the signal receiver 120_4. Based on this phenomenon, in an embodiment of the invention, after receiving the received signal strength indicator (Received Signal-Strength Indicator; RSSI) measured by each of the signal receivers 120_1 to 120_4, the electronic apparatus 130 can determine orientation information of the signal transmitter 110 and can further analyze a facing direction of an object wearing the signal transmitter 110.

Figure 3:
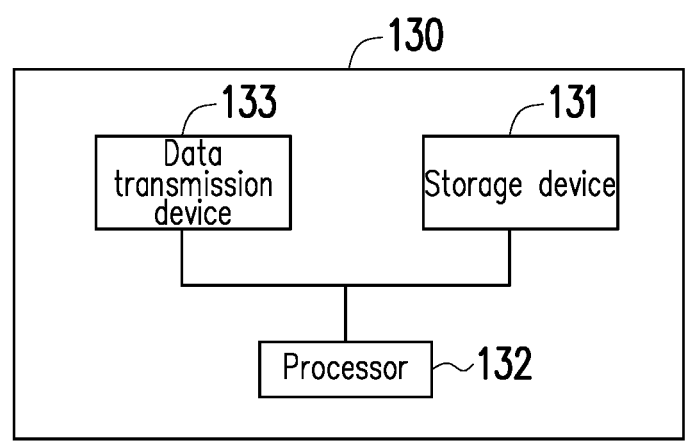
FIG. 3 is a block diagram illustrating an electronic apparatus in an embodiment of the invention.

FIG. 3 is a block diagram illustrating an electronic apparatus according to an embodiment of the invention. With reference to FIG. 3, the electronic apparatus 130 is coupled to the signal receivers 120_1 to 120_4. The electronic apparatus 130 is, for example, a computer device having a computing capability, such as a notebook computer, a desktop computer, a workstation computer, and a server device, which are not particularly limited by the invention.

The electronic apparatus 130 may include a storage device 131, a processor 132 and a data transmission device 133. The data transmission device 133 can receive signal measurement data from the signal receivers 120_1 to 120_4 through a wired or wireless data transmission technology. For instance, the data transmission device 133 is a hardware device that provides a network connection interface or a universal serial bus interface, but the invention is not limited thereto.

The processor 132 is coupled to the storage device 131 and the data transmission device 133. In the present embodiment, the processor 132 is, for example, a central processing unit (CPU) or other programmable microprocessors, a digital signal processor (DSP), a programmable controller, an application specific integrated circuits (ASIC), a programmable logic device (PLD) or other hardware device having a computing capability, but the invention is not limited thereto.

The storage device 131 is, for example, any fixed or a movable device including a RAM (Random Access Memory), a ROM (Read-Only Memory), a flash memory, a hard drive or other similar devices, or a combination of the above-mentioned devices. The storage device 131 is configured to record a plurality of commands that can be executed by the processor 132.

Figure 4:
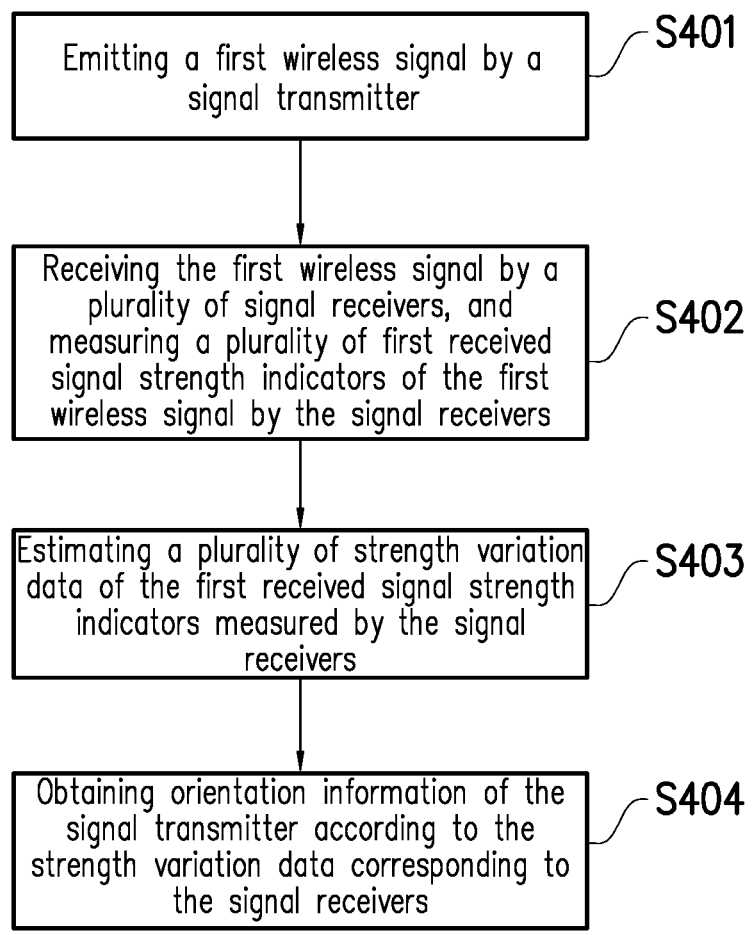
FIG. 4 is a flowchart of an object orientation method in an embodiment of the invention.

FIG. 4 is a flowchart illustrating an object orientation method according to an embodiment of the invention. With reference to FIG. 4, the method of the present embodiment is adapted to the object orientation system 10 and the electronic apparatus 130 in the above embodiment, and detailed steps in the object orientation method is described below in conjunction with each element in the object orientation system 10 and the electronic apparatus 130.

Referring to FIG. 4, in step S401, a first wireless signal is emitted by the signal transmitter 110. Here, the signal transmitter 110 emits the first wireless signal through the directional antenna 111 in a specific direction. In step S402, the first wireless signal is received by the signal receivers 120_1 to 120_4, and a plurality of first received signal strength indicators of the first wireless signal are measured by the signal receivers 120_1 to 120_4. Specifically, although the directional antenna 111 transmits the first wireless signal in the specific direction, based on factors like reflection and diffraction of the first wireless signal in the indoor environment, the signal receivers not located in the specific direction can also receive the first wireless signal. In an embodiment, each of the signal receivers 120_1 to 120_4 performs a received signal strength indicator measurement on the first wireless signal to obtain the first received signal strength indicator separately.

After that, the processor 132 can receive the first received signal strength indicators measured by the signal receivers 120_1 to 120_4 via the data transmission device 133. Further, in the example shown in FIG. 1, the processor 132 can receive four sets of the signal measurement data from the signal receivers 120_1 to 120_4 respectively.

Next, in step S403, the processor 132 estimates a plurality of strength variation data of the first received signal strength indicators measured by the signal receivers 120_1 to 120_4. Further, based on a pointing direction of the directional antenna 111 and each of orientations in which the signal receivers 120_1 to 120_4 are located, the first received signal strength indicators measured by the signal receivers 120_1 to 120_4 will be different from one another. The processor 132 can separately estimate a degree of variation of each of the measured first received signal strength indicators from the different signal receivers 120_1 to 120_4 to obtain the corresponding strength variation data. The strength variation data are used to indicate the degree of variation of the first received signal strength indicators measured by the signal receivers 120_1 to 120_4 in a preset sampling period.

In an embodiment, the strength variation data include a plurality of standard deviations of the first received signal strength indicators measured by the signal receivers 120_1 to 120_4 in the preset sampling period. That is to say, the processor 132 of the electronic apparatus 130 can calculate the standard deviations of the first received signal strength indicators measured by the signal receivers 120_1 to 120_4, respectively. In the example of FIG. 1, for the same preset sampling period, the processor 132 can generate four standard deviations related to the first wireless signal through statistical calculations. The four standard deviations are corresponding to the signal receivers 120_1 to 120_4, respectively. The calculation formula of the standard deviation is as shown in Equation (1) below:

$$SD = \sqrt{\frac{1}{N}\sum_{i=1}^{N}(x_i - \mu)^2} \qquad \text{Equation (1)}$$

Here, SD represents the standard deviation of the first received signal strength indicator in the preset sampling period; N is the total number of samples in the preset sampling period; $x_i$ represents the first received signal strength indicator; i represents the index of samples; μ represents an average of the first received signal strength indicators in the preset sampling period.

Nonetheless, in other embodiments, the processor 132 may also generate the strength variation data of the first received signal strength indicators measured by the signal receivers 120_1 to 120_4 through other calculation methods. For example, the processor 132 may also generate the strength variation data of the first received signal strength indicators according to a difference between a maximum value and a minimum value of the first received signal strength indicators in the preset sampling period.

After the strength variation data corresponding to the signal receivers 120_1 to 120_4 are respectively calculated, in step S404, the processor 132 obtains the orientation information of the signal transmitter 110 according to the strength variation data corresponding to the signal receivers 120_1 to 120_4. The orientation information of the signal transmitter 110 may include an absolute orientation pointed by a reference facing direction of the signal transmitter 110, and the reference facing direction is, for example, an antenna direction of the directional antenna 111. In general, the first received signal strength indicator measured by the signal receiver located in the antenna direction has the smallest degree of variation, whereas the first received signal strength indicator measured by the signal receiver located in an opposite direction of the antenna direction has the greatest degree of variation.

Figure 5:
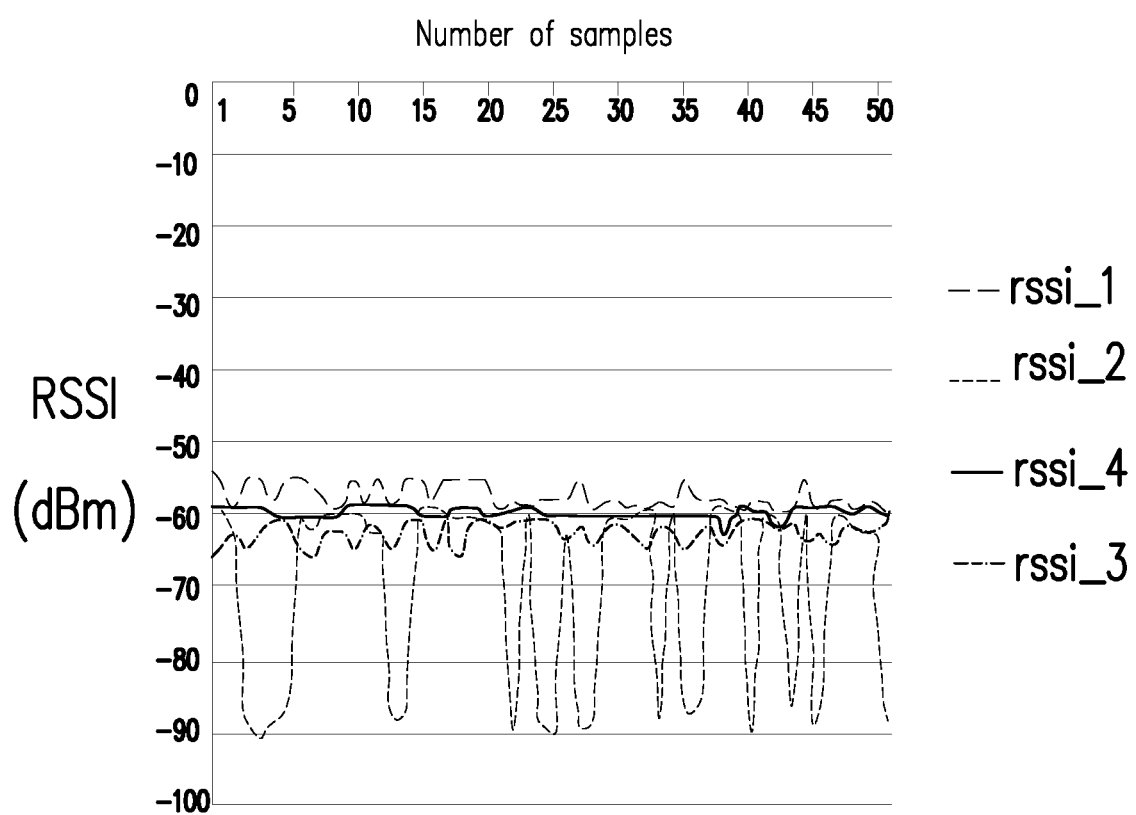
FIG. 5 is a schematic diagram of received signal strength indicators in an embodiment of the invention.

Therefore, in an embodiment, by comparing the strength variation data corresponding to each of the signal receivers 120_1 to 120_4, the processor 132 can determine the orientation information of the signal transmitter 110 based on each of the orientations in which the signal receivers 120_1 to 120_4 are located and each of the strength variation data. For instance, FIG. 5 is a schematic diagram illustrating an example of the received signal strength indicators according to an embodiment of the invention. It should be noted that, FIG. 5 is described by using the example shown in FIG. 2.

With reference to FIG. 5, based on the configuration of the radiation pattern RP of FIG. 2, the first received signal strength indicator measured by the signal receiver 120_1 in a preset period may be shown by a curve rssi_1. Further, the first received signal strength indicator measured by the signal receiver 120_2 in the preset period may be shown by a curve rssi_2; the first received signal strength indicator measured by the signal receiver 120_3 in the preset period may be shown by a curve rssi_3; and the first received signal strength indicator measured by the signal receiver 120_4 in the preset period may be shown by a curve rssi_4.

In view of the example of FIG. 5, since the first received signal strength indicator measured by the signal receiver 120_2 (the curve rssi_2) has the greatest degree of variation, the processor 132 can determine that the reference facing direction RD of the signal transmitter 110 points to the opposite direction of the orientation in which the signal receiver 120_2 is located. Since the first received signal strength indicator measured by the signal receiver 120_4 (the curve rssi_4) has the smallest degree of variation, the processor 132 can determine that the reference facing direction RD of the signal transmitter 110 points to the orientation in which the signal receiver 120_4 is located. In an application embodiment, if the signal receiver 120_2 is located in the North, the processor 132 can determine that the reference facing direction RD of the signal transmitter 110 points to the South.

In an embodiment assuming that the strength variation data are the standard deviations of the first received signal strength indicators, the processor 132 of the electronic apparatus 130 can determine the orientation information of the signal transmitter 110 according to the orientations in which the signal receivers 120_1 to 120_4 are located and the standard deviations corresponding to the signal receivers 120_1 to 120_4. In view of the example of FIG. 5, the processor 132 can determine that the standard deviation of the first received signal strength indicator measured by the signal receiver 120_2 (the curve rssi_2) will be greater than the standard deviations of the first received signal strength indicators measured by the signal receivers 120_1, 120_3 and 120_4 (the curves rssi_1, rssi_3 and rssi_4). Therefore, the processor 132 can obtain the orientation information of the signal transmitter 110 according to the orientation in which the signal receiver 120_2 is located.

Figure 6A:
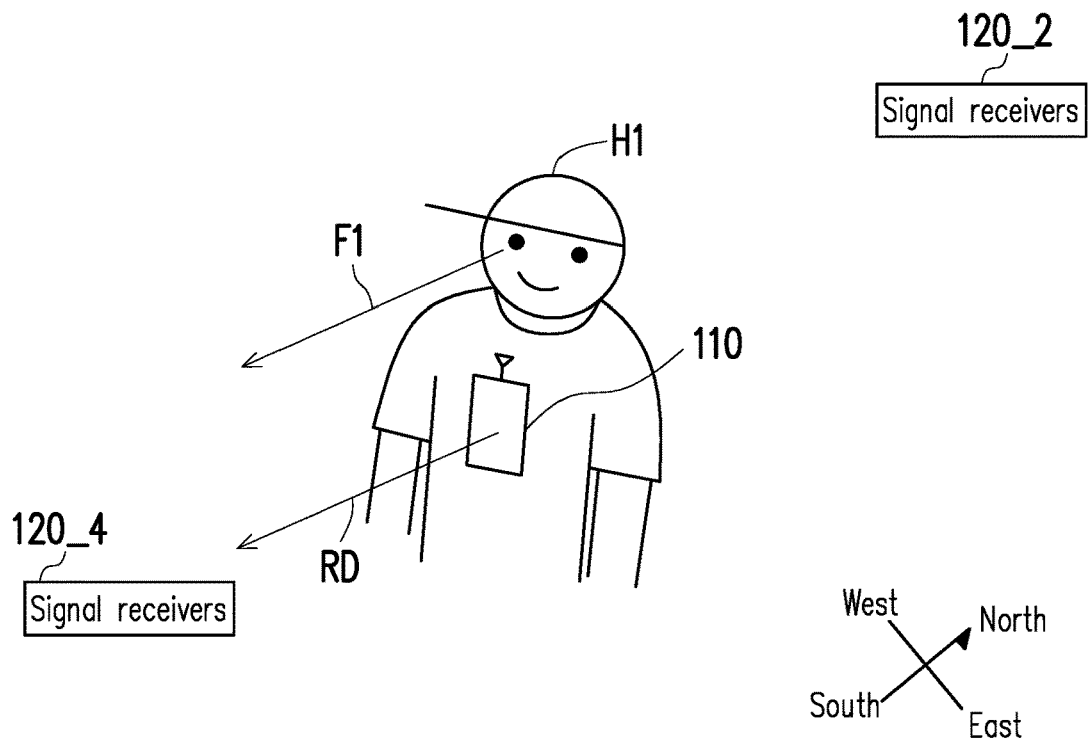
FIG. 6A to FIG. 6C are schematic diagrams illustrating an object wearing a signal transmitter in an embodiment of the invention.
Figure 6B:
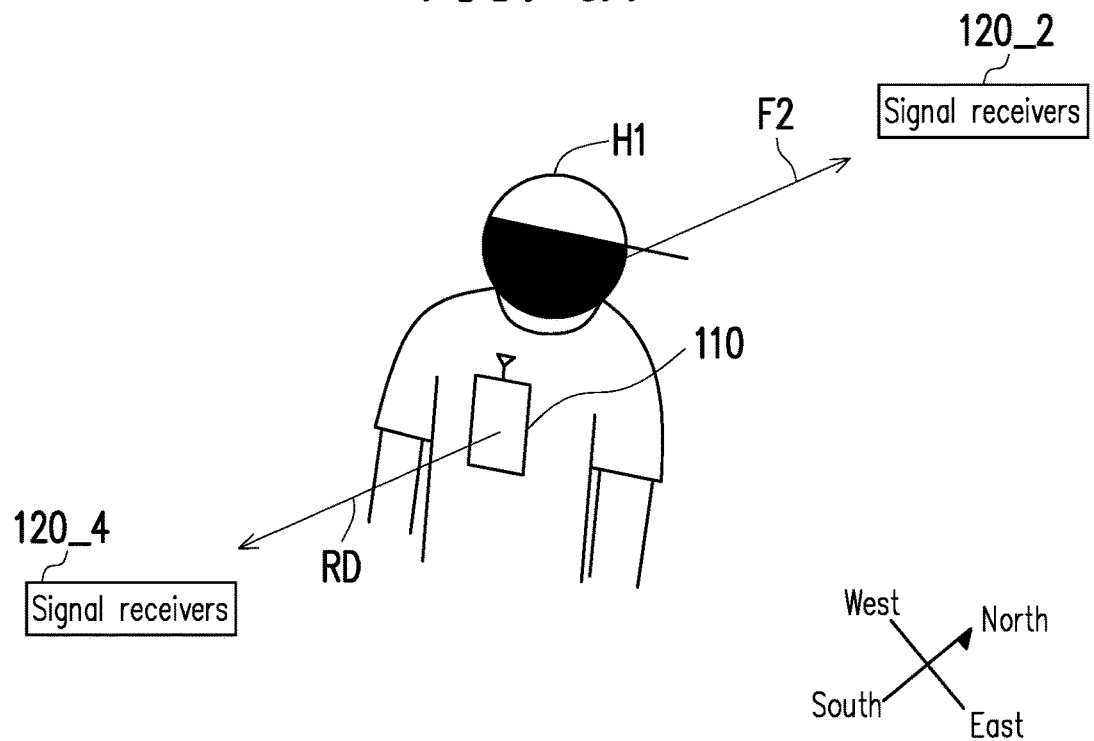
Figure 6C:
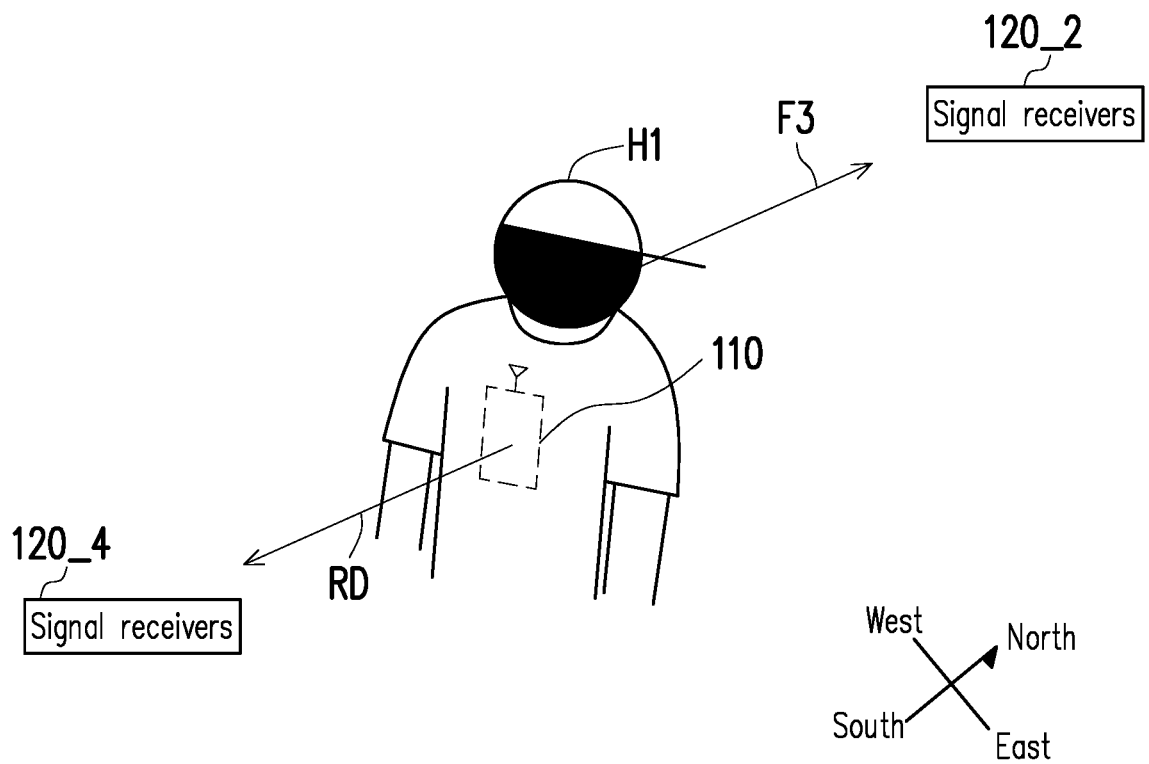

However, implementation of the invention is not limited to the above, and the content of the foregoing embodiment may be expanded based on actual requirements. FIG. 6A to FIG. 6C are schematic diagrams illustrating an object wearing a signal transmitter according to an embodiment of the invention. Referring to FIG. 6A first, a character H1 (a.k.a. the object wearing the signal transmitter 110) can wear the signal transmitter 110 at the front of body. In the example of FIG. 6A, the reference facing direction RD of the signal transmitter 110 (e.g., the antenna direction of the directional antenna 111 of the signal transmitter 110) may be equivalent to a facing direction F1 of the character H1. Referring to FIG. 6B, the character H1 can wear the signal transmitter 110 at the back of body. In the example of FIG. 6B, an opposite direction of the reference facing direction RD of the signal transmitter 110 may be equivalent to a facing direction F2 of the character H1. Referring to FIG. 6C, the character H1 can wear the signal transmitter 110 at the front of body. In the example of FIG. 6C, an opposite direction of the reference facing direction RD of the signal transmitter 110 may be equivalent to a facing direction F3 of the character H1. Comparing the examples of FIG. 6A and FIG. 6C, based on the difference in terms of a relative orientation between the signal transmitter 110 and the object wearing the signal transmitter 110, in the case where the reference facing direction RD of the signal transmitter 110 remains the same, the character H1 may face the facing direction F3 or the facing direction F1 which are different from each other.

Therefore, in an embodiment of the invention, by adjusting an emissive power of the signal transmitter 110 and comparing the received signal strength indicators measured based on different emissive powers, the electronic apparatus 30 can analyze the relative orientation between the signal transmitter 110 and the object wearing the signal transmitter 110, so as to further confirm the facing direction of the object wearing the signal transmitter 110. An embodiment is provided below for detailed description.

Figure 7:
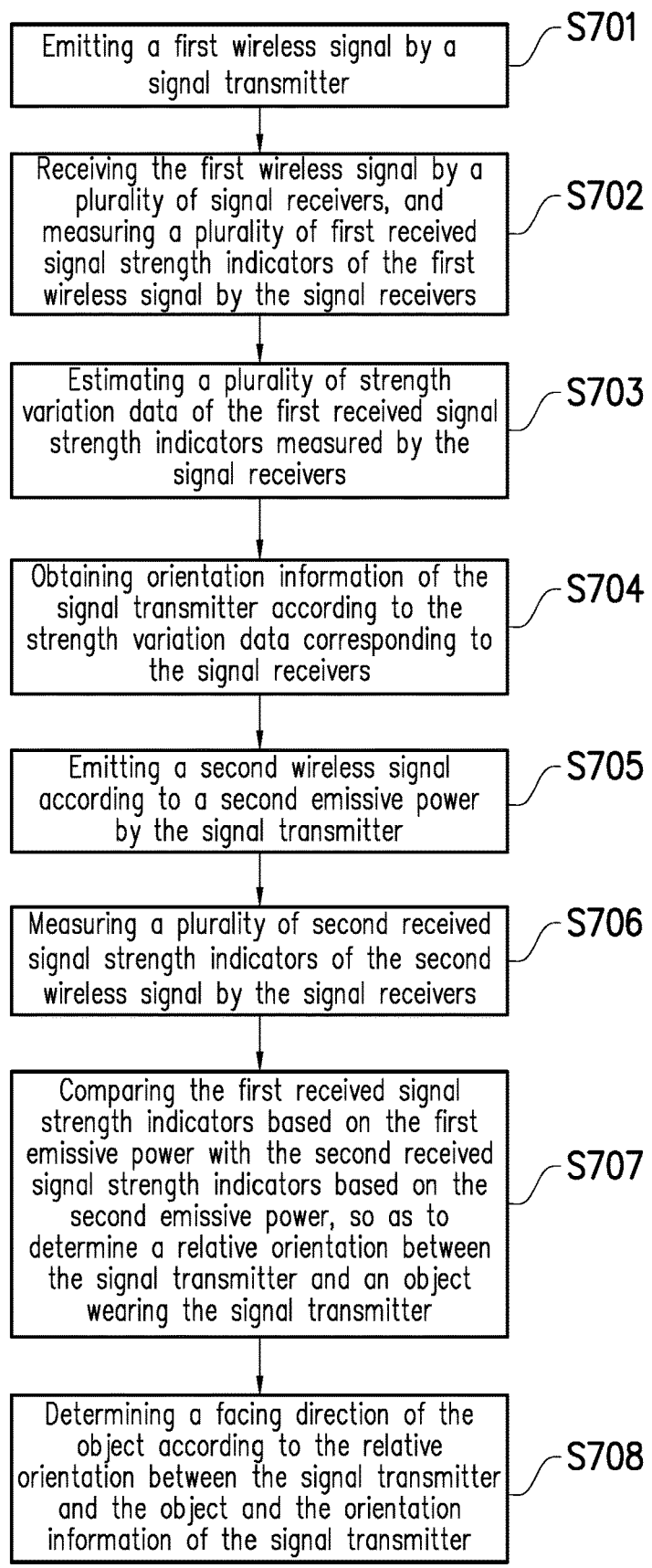
FIG. 7 is a flowchart of an object orientation method in an embodiment of the invention.

FIG. 7 is a flowchart illustrating an object orientation method according to an embodiment of the invention. Referring to FIG. 1 and FIG. 7 together, the method of the present embodiment is adapted to the object orientation system 10 and the electronic apparatus 130, and detailed steps in the object orientation method is described below in conjunction with each element in the object orientation system 10 and the electronic apparatus 130.

In step S701, a first wireless signal is emitted by the signal transmitter 110. In step S702, the first wireless signal is received by the signal receivers 120_1 to 120_4, and a plurality of first received signal strength indicators of the first wireless signal are measured by the signal receivers 120_1 to 120_4. In step S703, the processor 132 estimates a plurality of strength variation data of the first received signal strength indicators measured by the signal receivers 120_1 to 120_4. In step S704, the processor 132 obtains orientation information of the signal transmitter 110 according to the strength variation data corresponding to the signal receivers 120_1 to 120_4.

Operations of step S701 to S704 are similar to operations of step S401 to S404, which are not repeated hereinafter. It should be noted that, the signal transmitter 110 emits the first wireless signal according to a first emissive power.

Next, in step S705, a second wireless signal is emitted according to a second emissive power by the signal transmitter 110. The first emissive power is different from the second emissive power. In step S706, a plurality of second received signal strength indicators of the second wireless signal are measured by the signal receivers 120_1 to 120_4. In detail, the signal transmitter 110 can emit the first wireless signal based on the first emissive power in a first period, and later, the signal transmitter 110 can emit the second wireless signal based on the second emissive power in a second period. When the emissive power of the signal transmitter 110 is being adjusted, the received signal strength indicators measured by the signal transmitters 120_1 to 120_4 in the first period and the second period will also be changed.

In step S707, the processor 132 compares the first received signal strength indicators based on the first emissive power with the second received signal strength indicators based on the second emissive power, so as to determine a relative orientation between the signal transmitter 110 and an object wearing the signal transmitter 110 (e.g., the character H1). For instance, the processor 132 may first collect the first signal received signal strength indicator based on the first emissive power measured by the signal receiver 120_4, then collect the second received signal strength indicator based on the second emissive power measured by the signal receiver 120_4, and compare the first and the second signal received signal strength indicators. In an embodiment, the relative orientation between the signal transmitter 110 and the object wearing the signal transmitter 110 represents a relative orientation of the object relative to the signal transmitter 110.

In general, if the signal transmitter 110 measures the first received signal strength indicator and the second received signal strength indicator in the case where the object is not shielded, a difference between the first received signal strength indicator and the second received signal strength indicator will be obvious and stable. Conversely, if the signal transmitter 110 measures the first received signal strength indicator and the second received signal strength indicator in the case where the object is shielded, the difference between the first received signal strength indicator and the second received signal strength indicator will not be obvious and stable. Accordingly, by comparing the first received signal strength indicators and the second received signal strength indicators collected by one of the signal receivers 120_1 to 120_4, the processor 132 can determine whether the object wearing the signal transmitter 110 is located between one of the signal receivers 120_1 to 120_4 and the signal transmitter 110 to thereby determine the relative orientation between the signal transmitter 110 and the object wearing the signal transmitter 110.

Figure 8A:
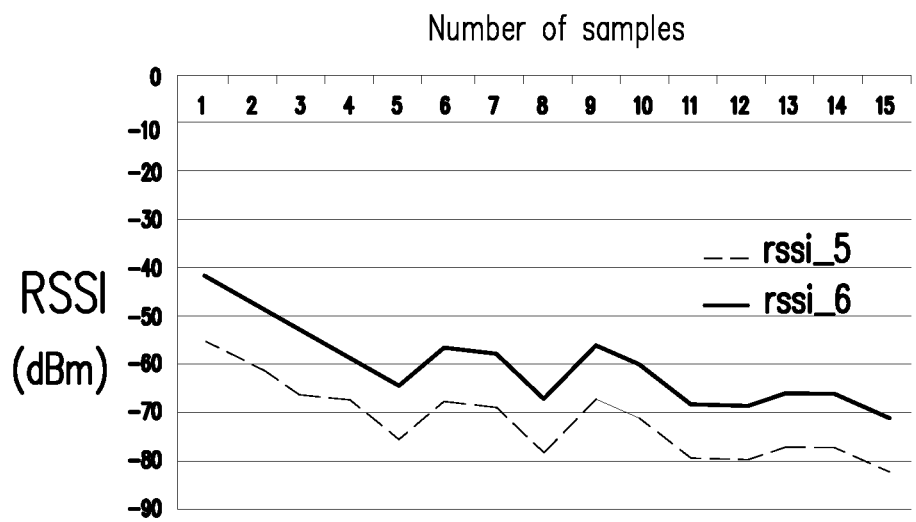
FIG. 8A is a schematic diagram of received signal strength indicators based on a first emissive power in an embodiment of the invention.
Figure 8B:
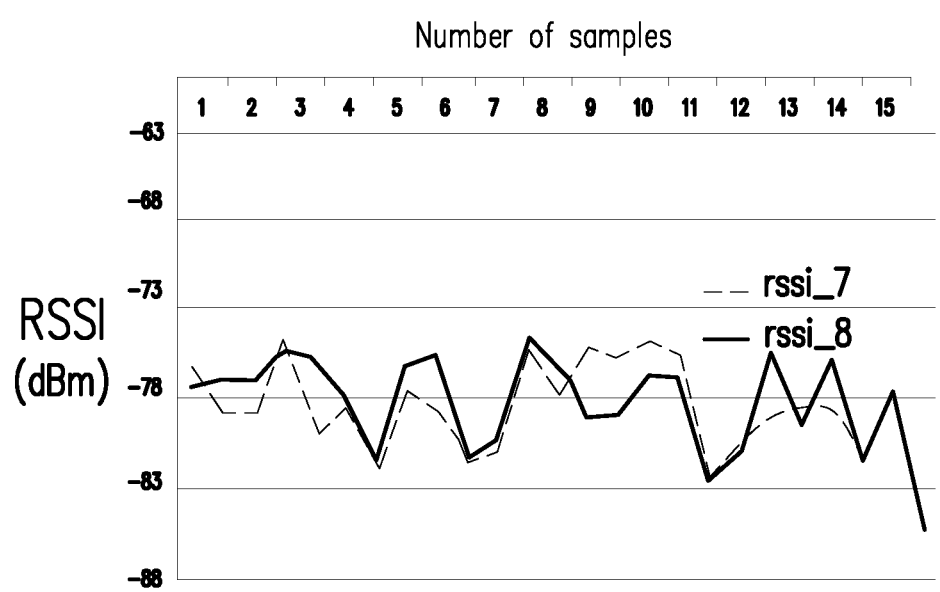
FIG. 8B is a schematic diagram of received signal strength indicators based on a second emissive power in an embodiment of the invention.

For example, FIG. 8A is a schematic diagram illustrating received signal strength indicators based on the first emissive power according to an embodiment of the invention. FIG. 8B is a schematic diagram illustrating received signal strength indicators based on the second emissive power according to an embodiment of the invention. It should be noted that, FIG. 8A and FIG. 8B are described using the configuration of FIG. 6A and FIG. 6B. On that basis, the first received signal strength indicator and the second received signal strength indicator measured by the signal receiver 120_4 are as shown by FIG. 8A, and the first received signal strength indicator and the second received signal strength indicator measured by the signal receiver 120_2 are as shown by FIG. 8B.

The first received signal strength indicator measured by the signal receiver 120_4 in a first preset period is as shown by a curve rssi_5, and the second received signal strength indicator measured by the signal receiver 120_4 in a second preset period is as shown by a curve rssi_6. The first received signal strength indicator measured by the signal receiver 120_2 in the first preset period is as shown by a curve rssi_7, and the second received signal strength indicator measured by the signal receiver 120_2 in the second preset period is as shown by a curve rssi_8.

With reference to FIG. 8A, because the signal receiver 120_4 measures the first received signal strength indicator based on the first emissive power and the second received signal strength indicator based on the second emissive power in the case where the character H1 is not shielded, the difference between the first received signal strength indicator and the second received signal strength indicator will be obvious and stable at different sampling times. Conversely, because the signal receiver 120_2 measures the first received signal strength indicator based on the first emissive power and the second received signal strength indicator based on the second emissive power in the case where the character H1 is shielded, the difference between the first received signal strength indicator and the second received signal strength indicator will not be obvious and stable at different sampling times. Therefore, in the exemplary embodiments of FIG. 8A and FIG. 8B, according to the difference between the first received signal strength indicators based on the first emissive power with the second received signal strength indicators based on the second emissive power, the processor 132 can determine the relative orientation between the signal transmitter 110 and the character H1, i.e., determine that the character H1 is located in the North of the signal transmitter 110.

Referring back to the process in FIG. 7, lastly, in step S708, the processor 132 determines a facing direction of the object according to the relative orientation between the signal transmitter 110 and the object and the orientation information of the signal transmitter 110. Further, based on a wearing manner of the object wearing the signal transmitter 110, the processor 132 can determine the facing direction of the object according to the relative orientation between the signal transmitter 110 and the object and the orientation information of the signal transmitter 110.

For example, in the exemplary embodiment of FIG. 6A and FIG. 6B, the processor 132 can determine that the reference facing direction of the signal transmitter 110 points to the South according to the strength variation data, and can determine that the character H1 is located in the North of the signal transmitter 110 by adjusting the emissive power. In this condition, if the character H1 wears the signal transmitter 110 at the front of body, the processor 132 can determine that the facing direction F1 of the character H1 is the South according to a direction of the reference facing direction RD and the relative orientation between the character H1 and the signal transmitter 110. If the character H1 wears the signal transmitter 110 at the back of body, the processor 132 can determine that the facing direction F2 of the character H1 is the North according to the direction of the reference facing direction RD and the relative orientation between the character H1 and the signal transmitter 110.

Figure 9:
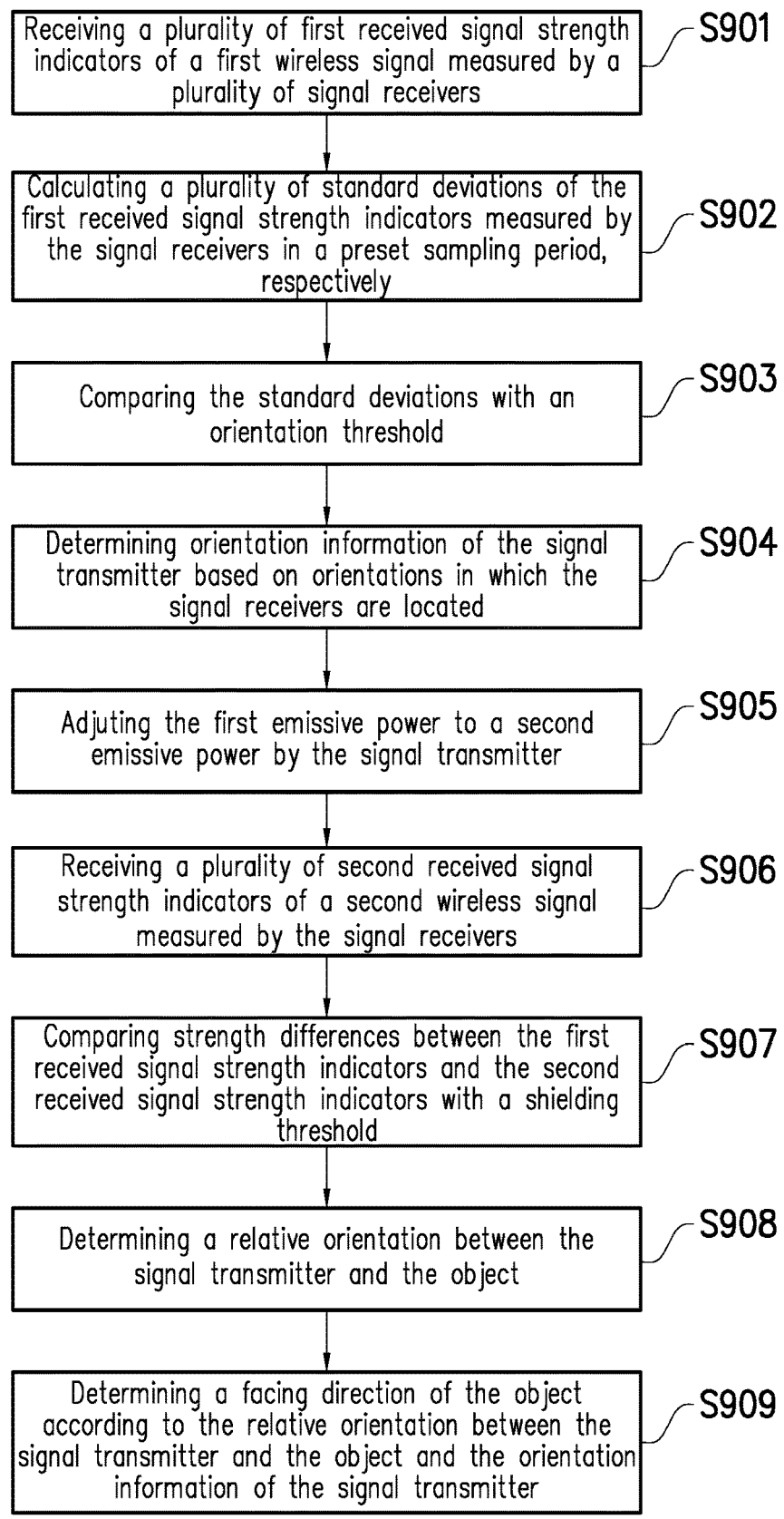
FIG. 9 is a flowchart of an object orientation method in an embodiment of the invention.

A specific implementation will be provided below to illustrate how the orientation information of the signal transmitter is determined according to the strength variation data and how the relative orientation between the signal transmitter and the object is determined according to the received signal strength indicators measured based on different emissive powers. FIG. 9 is a flowchart illustrating an object orientation method according to an embodiment of the invention. With reference to FIG. 9, the method of the present embodiment is adapted to the object orientation system 10 and the electronic apparatus 130 in the above embodiment, and detailed steps in the object orientation method is described below in conjunction with each element in the object orientation system 10 and the electronic apparatus 130.

In step S901, the processor 132 receives a plurality of first received signal strength indicators of a first wireless signal measured by the signal receivers 120_1 to 120_4. In step S902, the processor 132 calculates a plurality of standard deviations of the first received signal strength indicators measured by the signal receivers 120_1 to 120_4 in a preset sampling period, respectively.

In step S903, the processor 132 compares the standard deviations with an orientation threshold. Specifically, the processor 132 can compare the standard deviations corresponding to the signal receivers 120_1 to 120_4 with the orientation threshold. A size of the orientation threshold may be designed based on actual requirements. In step S904, the processor 132 determines orientation information of the signal transmitter 110 based on orientations in which the signal receivers 120_1 to 120_4 are located. For example, if one of the standard deviations is greater than the orientation threshold, the processor 132 can determine the orientation information of the signal transmitter 110 according to the orientation in which the signal receiver corresponding to the standard deviation being greater than the orientation threshold is located.

In step S905, the first emissive power is adjusted to a second emissive power by the signal transmitter 110. In step S906, the processor 132 receives a plurality of second received signal strength indicators of a second wireless signal measured by the signal receivers 120_1 to 120_4.

In step S907, the processor 132 compares strength differences between the first received signal strength indicators and the second received signal strength indicators with a shielding threshold. In step S908, the processor 132 determines a relative orientation between the signal transmitter 110 and the object. For instance, the processor 132 can compare the first received signal strength indicators and the second received signal strength indicators measured by each of the signal receivers 120_1 to 120_4, respectively, so as to obtain the strength differences respectively corresponding to the signal receivers 120_1 to 120_4. By comparing the strength differences respectively corresponding to the signal receivers 120_1 to 120_4 with the shielding threshold, the processor 132 can determine whether the difference between the first received signal strength indicator and the second received signal strength indicator is stable and obvious, and obtain the relative orientation between the signal transmitter 110 and the object based on the orientations in which the signal receivers 120_1 to 120_4 are located. Lastly, in step S909, the processor 132 determines a facing direction of the object according to the relative orientation between the signal transmitter 110 and the object and the orientation information of the signal transmitter 110.

In summary, according to the embodiments of the invention, the signal transmitter emits the wireless signal through the directional antenna. Based on the degree of variation of the received signal strength indicator measured by each of the signal receivers, the electronic apparatus can determine the orientation information of the signal transmitter according to the orientations in which the signal receivers are located. In this way, the invention can obtain the orientation information of the signal transmitter without using the orientation sensor, and has obvious cost-effectiveness. Moreover, by adjusting the emissive power of the wireless signal and comparing the received signal strength indicators measured based on the different emissive powers, the electronic apparatus can determine the relative orientation between the signal transmitter and the object wearing the signal transmitter. In this way, the facing direction of the object wearing the signal transmitter can be obtained according to the orientation information of the signal transmitter and the relative orientation described above, so as to provide an object orientation system that is more flexible in use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object orientation system, comprising:
    a signal transmitter, comprising a directional antenna, and emitting a first wireless signal;
    a plurality of signal receivers, respectively disposed in a plurality of orientations, receiving the first wireless signal, and measuring a plurality of first received signal strength indicators of the first wireless signal; and
    an electronic apparatus, coupled to the signal receivers, estimating a plurality of strength variation data of the first received signal strength indicators measured by the signal receivers, and obtaining orientation information of the signal transmitter according to the strength variation data corresponding to the signal receivers;
    wherein in the operation where the electronic apparatus estimates the strength variation data of the first received signal strength indicators measured by the signal receivers,
    the electronic apparatus respectively calculates a plurality of standard deviations of the first received signal strength indicators measured by the signal receivers in a preset sampling period;
    wherein in the operation where the electronic apparatus obtains the orientation information of the signal transmitter according to the strength variation data corresponding to the signal receivers,
    the electronic apparatus determines the orientation information of the signal transmitter according to the orientations in which the signal receivers are located and the standard deviations corresponding to the signal receivers, wherein the orientation information of the signal transmitter comprises an absolute orientation pointed by a reference facing direction of the signal transmitter.

2. The object orientation system according to claim 1, wherein in the operation where the electronic apparatus determines the orientation information of the Signal transmitter according to the orientations in which the signal receivers are located and the standard deviations corresponding to the signal receivers,
    the electronic apparatus compares the standard deviations with an orientation threshold to determine the orientation information of the signal transmitter based on the orientations in which the signal receivers are located.

3. The object orientation system according to claim 1, wherein the signal transmitter emits the first wireless signal according to a first emissive power, and emits a second wireless signal according to a second emissive power, wherein the first emissive power is different from the second emissive power,
    wherein the signal receivers measure a plurality of second received signal strength indicators of the second wireless signal, and the electronic apparatus compares the first received signal strength indicators based on the first emissive power with the second received signal strength indicators based on the second emissive power to determine a relative orientation between the signal transmitter and an object wearing the signal transmitter.

4. The object orientation system according to claim 3, wherein the electronic apparatus determines a facing direction of the object according to the relative orientation between the signal transmitter and the object and the orientation information of the signal transmitter.

5. The object orientation system according to claim 3, wherein in the operation where the electronic apparatus compares the first received signal strength indicators based on the first emissive power with the second received signal strength indicators based on the second emissive power,
    the electronic apparatus compares strength differences between the first received signal strength indicators and the second received signal strength indicators with a shielding threshold.

6. An object orientation method, comprising:
emitting a first wireless signal by a signal transmitter, wherein the signal transmitter comprises a directional antenna;
receiving the first wireless signal by a plurality of signal receivers, and measuring a plurality of first received signal strength indicators of the first wireless signal by the signal receivers;
estimating a plurality of strength variation data of the first received signal strength indicators measured by the signal receivers, comprising:
respectively calculating a plurality of standard deviations of the first received signal strength indicators measured by the signal receivers in a preset sampling period; and
obtaining orientation information of the signal transmitter according to the strength variation data corresponding to the signal receivers, comprising:
determining the orientation information of the signal transmitter according to a plurality of orientations in which the signal receivers are located and the standard deviations corresponding to the signal receivers, wherein the orientation information of the signal transmitter comprises an absolute orientation pointed by a reference facing direction of the signal transmitter.

7. The object orientation method according to claim 6, wherein the step of determining the orientation information of the signal transmitter according to the orientations in which the signal receivers are located and the standard deviations corresponding to the signal receivers comprises:
comparing the standard deviations with an orientation threshold to determine the orientation information of the signal transmitter based on the orientations in which the signal receivers are located.

8. The object orientation method according to claim 6, wherein the signal transmitter emits the first wireless signal according to a first emissive power, and the method further comprises:
emitting a second wireless signal according to a second emissive power by the signal transmitter, wherein the first emissive power is different from the second emissive power;
measuring a plurality of second received signal strength indicators of the second wireless signal by the signal receivers; and
comparing the first received signal strength indicators based on the first emissive power with the second received signal strength indicators based on the second emissive power to determine a relative orientation between the signal transmitter and an object wearing the signal transmitter.

9. The object orientation method according to claim 8, further comprising:
determining a facing direction of the object according to the relative orientation between the signal transmitter and the object and the orientation information of the signal transmitter.

10. The object orientation method according to claim 8, wherein the step of comparing the first received signal strength indicators based on the first emissive power with the second received signal strength indicators based on the second emissive power comprises:
comparing strength differences between the first received signal strength indicators and the second received signal strength indicators with a shielding threshold.

11. An electronic apparatus, comprising:
a data communication device, receiving a plurality of first received signal strength indicators of a first wireless signal emitted by a signal transmitter;
a storage device, storing a plurality of commands; and
a processor, coupled to the storage device and the data communication device, and executing the commands for:
estimating a plurality of strength variation data of the first received signal strength indicators measured by a plurality of signal receivers, and obtaining orientation information of the signal transmitter according to orientations in which the signal receivers are located and the strength variation data corresponding to the signal receivers, wherein the strength variation data comprises a plurality of standard deviations of the first received signal strength indicators measured by the signal receivers in a preset sampling period; and
determining the orientation information of the signal transmitter according to the orientations in which the signal receivers are located and the standard deviations corresponding to the signal receivers, wherein the orientation information of the signal transmitter comprises an absolute orientation pointed by a reference facing direction of the signal transmitter.

12. The electronic apparatus according to claim 11, wherein the processor executes the commands for:
comparing the standard deviations with an orientation threshold to determine the orientation information of the signal transmitter based on the orientations in which the signal receivers are located.

13. The electronic apparatus according to claim 11, wherein the data communication device receives a plurality of second received signal strength indicators of a second wireless signal emitted by the signal transmitter, wherein the first wireless signal is emitted according to a first emissive power and the second wireless signal is emitted according to a second emissive power, wherein the first emissive power is different from the second emissive power,
and the processor executes the commands for:
comparing the first received signal strength indicators based on the first emissive power with the second received signal strength indicators based on the second emissive power to determine a relative orientation between the signal transmitter and an object wearing the signal transmitter.

14. The electronic apparatus according to claim 13, wherein the processor executes the commands for: determining a facing direction of the object according to the relative orientation between the signal transmitter and the object and the orientation information of the signal transmitter.

15. The electronic apparatus according to claim 13, wherein the processor executes the commands for: comparing strength differences between the first received signal strength indicators and the second received signal strength indicators with a shielding threshold.

* * * * *